F. E. BRIGHT.
CHUCK.
APPLICATION FILED JAN. 30, 1915.

1,239,873.

Patented Sept. 11, 1917.

UNITED STATES PATENT OFFICE.

FRED E. BRIGHT, OF PHILADELPHIA, PENNSYLVANIA.

CHUCK.

1,239,873.  Specification of Letters Patent.  Patented Sept. 11, 1917.

Application filed January 30, 1915. Serial No. 5,182.

*To all whom it may concern:*

Be it known that I, FRED E. BRIGHT, a citizen of the United States, residing at Philadelphia, in the county of Philadelphia and State of Pennsylvania, have invented certain new and useful Improvements in Chucks, of which the following is a specification, reference being had therein to the accompanying drawing.

This invention relates to chucks or work holders, adapted to be operated to firmly clamp and hold the work which is to be subjected to shaping, forming, or other operations, the objects of the invention being to provide a simple and effective construction in which the work may be held in proper and accurate relation to the operating tool, and by which the work may be handled with speed and facility in the clamping and releasing actions of the chuck.

My invention is designed with special reference to the handling of annular or sleeve-like forms, such as the outer casing members of antifriction bearings, to enable their internal surfaces to be operated on, and with this end in view, and in accordance with my invention, the chuck is provided with a work seat or rest against which the work is seated, and coöperating with which are a series of clamping jaws movably mounted on the body of the chuck, so that the active clamping ends of the jaws may be moved to and from the work seat, suitable means of improved form being provided for maintaining the jaws in clamping engagement with the work, and for moving the jaws to release the work. In the more specific embodiment of the invention, the clamping jaws are extended in the general direction of the axis of the chuck, and pivoted thereto between their ends on transverse axes, the active ends of the jaws facing inwardly so as to engage the work with a clamping pressure, spring actuated means being provided for maintaining the jaws yieldingly in engagement with the work, and an actuating device being provided for moving the jaws in opposition to the spring actuated means in order to disengage the same from the work to permit the latter to be removed.

In the accompanying drawings I have illustrated my improved device in the particular detailed form which I prefer to adopt, and which in practice has been found to answer to a satisfactory degree the results and advantages aimed at, the form of construction shown being merely by way of example. It is manifest, therefore, that the details may be variously modified by the skilled mechanic without departing from the limits of my invention; and it will be understood that the invention is not limited to any particular form or construction of the parts except in so far as such limitations are specified in the claims.

Figure 3:
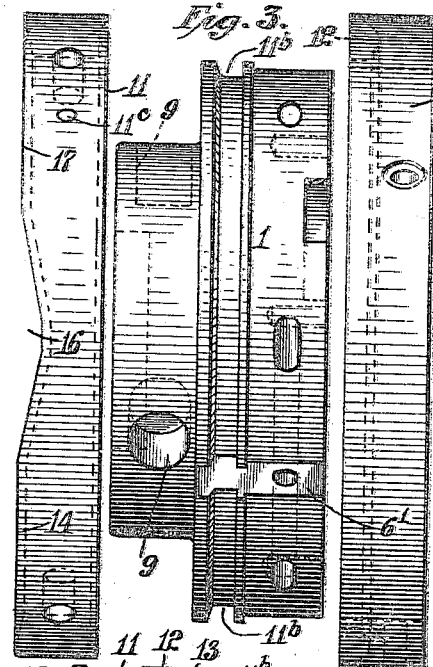
Fig. 3 is a side elevation of certain parts of the device separated from each other.
Figure 4:
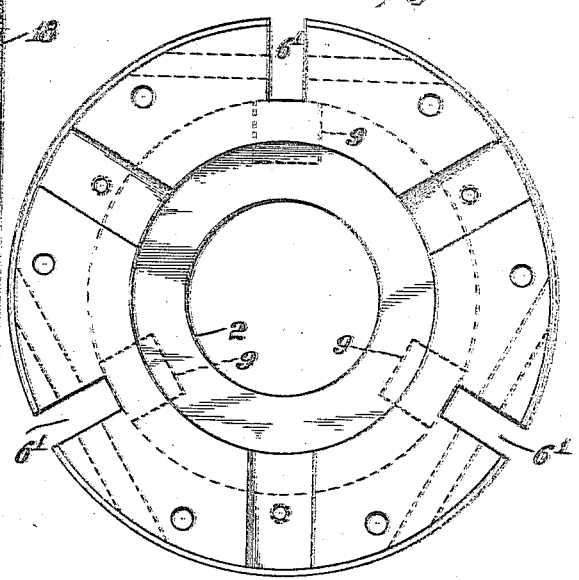
Fig. 4 is a face view of the main body portion of the chuck, with certain parts removed to better illustrate the form and construction of said body portion.

Referring to the drawings:

1 represents the body of the chuck which is of annular form and adapted to be attached to a lathe or other suitable machine, by means of the central threaded opening 2, or by other suitable means. The front face of the body is provided with a work seat in the form of three plates 3, the inner edges of which are of segmental form, with a flat radially extending ledge $3^a$, and an adjoining axially extending surface or shoulder $3^b$, the several ledges and shoulders extending in a curve struck from a common axial center so that they constitute in effect a work seat of general circular form. The work seat thus formed is shown in the present instance as giving support to the outer casing member of an antifriction bearing indicated by dotted lines in Fig. 1, the inner end of said member resting on the radial seats $3^a$, and the adjacent peripheral edge of the member being embraced by the axially extending shoulders $3^b$. The segmental plates 3 are firmly fixed to the face of the body portion 1 in such manner that they may be adjusted radially relatively thereto to provide for work of different sizes, the plates being formed for this purpose with slots 4, through which extend fastening screws 5 threaded into the face of the body.

Figure 1:
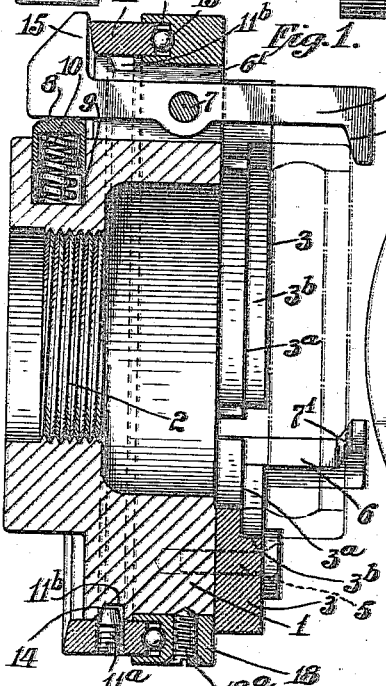
Figure 1 is a longitudinal sectional elevation through my improved chuck, showing the clamping jaws in the position they occupy in clamping the work to its seat, the clamped work being indicated by dotted lines.
Figure 2:
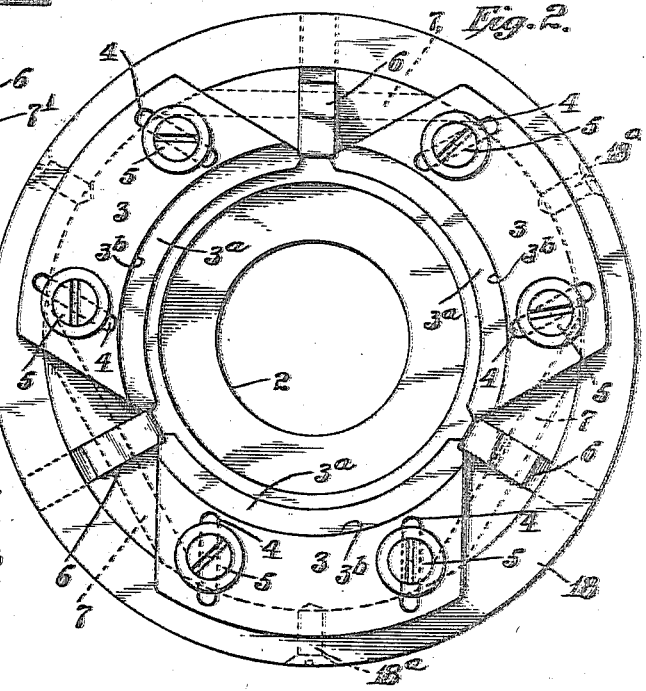
Fig. 2 is a front elevation of the same.

6 indicates work clamping jaws, in the present instance three in number, which extend axially of the body and which are pivoted between their ends in open slots 6' formed at intervals in the outer edge of the body, the said jaws being pivoted in these openings by means of transversely extending studs 7 seated in transverse openings in the body and extending through the slots and jaws, the construction being such that the jaws may be rocked on their pivotal axes in clamping and releasing the work. The front ends of the jaws are extended radially inwardly, and are each formed with an active clamping surface 7', which is inclined so that the several surfaces will engage, when the front ends of the jaws are moved inwardly, with a wedging action on the outer circumferential corner of the work, and in this manner will force the work backwardly and will press and hold the same firmly on its seat. Means are provided for holding the inclined clamping surfaces of the jaws in yielding engagement with the work, to the end that allowance will be made for the expansion of the work under the influence of heat developed in the grinding operation. To effect this object, the jaws at the rear side of their pivotal axes, are acted on by spring-pressed plungers 8 which are mounted in radial sockets 9 formed in the body portion 1, the said plungers being urged outwardly by means of springs 10 seated in said sockets and bearing at their outer ends against the plungers, the tendency of the springs being to urge the plungers outwardly with a yielding pressure against the rear ends of the jaws, whereby their forward active ends will be urged inwardly, and the inclined clamping surfaces maintained in yielding engagement with the work. The clamping jaws are moved on their pivotal axes against the action of the spring plungers, to disengage the inclined clamping surfaces from the work and release the same, by means of an operating member in the form of a circumferentially movable ring 11 surrounding the body portion 1, and seated at its forward end in an annular socket 12 in said body portion, a number of antifriction balls 13 being seated between the end of the ring and bottom of the socket in order to avoid friction, and render the movement of the ring free. The ring is confined and guided circumferentially on the body portion, by means of a number of pins 11ª fixed to the ring at intervals therearound and extending inwardly radially with their inner ends projecting into a peripheral open slot 11ᵇ in the side of the body portion. The rear end of the ring is formed with a cam surface 14 adapted to engage the forward faces of radially extending fingers 15 projecting outwardly from the rear ends of the clamping jaws. This cam surface is formed with three depressed portions 16, intermediate of which are three elevated portions 17, and by the circumferential movement of the ring, the said elevated and depressed portions of the cam surface may be brought respectively into engagement with the fingers 15 of the clamping jaws. When the ring is so adjusted that the depressed portions 16 of the cam surface are in engagement with the fingers, the jaws will be held yieldingly in clamping engagement with the work by means of the spring plungers 8 as shown in Fig. 1; and when the ring is adjusted to bring the elevated portions 17 of the cam surface in engagement with the fingers, the clamping jaws will be swung positively on their pivotal axes inwardly at their rear ends and outwardly at their opposite clamping ends, with the result that the latter ends of the jaws will be disengaged from the work, and the latter will be released and free to be removed from the chuck.

By reason of the fact, that, as before stated, the active clamping surfaces 7' of the jaws are inclined, they will, when the jaws are moved inwardly by the spring plungers, act with a wedging effect on the work, the pressure of the spring plungers under these conditions being sufficient to hold the work with the requisite degree of firmness to permit the proper operations to be performed thereon. The work will thus be held yieldingly against its seat, and the several clamping jaws being independently sustained in a yielding manner, the expansion of the work under the influence of heat will be permitted without affecting the clamping action of the jaws as a whole and the latter will therefore maintain the work accurately centered with relation to the axis of the chuck.

For structural purposes, I prefer to form the groove 12, in which the ring 11 is seated, in an annular frame 18 separate from the body portion 1, which frame surrounds the said body portion and is firmly and fixedly connected thereto by means of screws 18ª or other suitable fastening means, the frame 18 thus forming in effect a part of the body portion of the chuck.

The ring 11 may be adjusted circumferentially in any appropriate and suitable manner, it being in the present instance provided with holes 11ᶜ to receive a spanner wrench or other suitable tool.

I claim:

1. In a chuck, the combination with a head or frame, of clamping jaws mounted thereon and movable independently to clamp the work, springs sustained by the head and acting to hold the jaws independently of each other in yielding engagement with the work to clamp the same in position, and means for moving the jaws in opposition to the action of the springs to release the work.

2. In a chuck, the combination with a head or frame, of clamping jaws pivoted between their ends thereto and extending axially thereof to rock on their pivots radially toward each other to clamp the work on its seat, springs acting on said jaws to hold the same independently of each other in yielding clamping engagement with the work, and a circumferentially movable member adapted to move the jaws in opposition to the springs to release the work.

3. In a chuck, and in combination with a head or frame, axially extending clamping jaws pivoted thereto between their ends, and adapted at one of their ends to engage the work, springs acting independently of each other on the opposite ends of the jaws and operating to hold the jaws independently of each other in yielding engagement with the work with a clamping pressure, and a circumferentially movable ring mounted on the head and provided with a cam surface having alternately disposed elevated and depressed portions adapted to respectively engage the jaws and to control the movement of the same.

4. In a chuck, and in combination with a head or frame provided with a work seat, clamping jaws movably mounted thereon and provided with sloping clamping faces to engage and clamp the work against the seat with a wedging action, yielding means acting independently of each other on the respective jaws to maintain said sloping surfaces in independent yielding clamping engagement with the work, and means for moving the jaws to release the work.

5. In a chuck, and in combination with a head or frame, a plurality of plates fixed thereto and having their inner edges of segmental form to conjointly constitute a work seat of general circular form, means for adjusting said plates radially on the head to vary the size of the work seat, and clamping jaws mounted on the head between the ends of the plates and movable to hold the work on its seat.

6. In a chuck, and in combination with a head or frame, a plurality of clamping jaws extending axially thereof and pivoted between their ends to said head on transverse axes, the forward ends of said jaws being adapted to engage and clamp the work in position, outwardly extending fingers on the rear ends of the jaws, radially arranged spring actuated plungers mounted in the head and engaging the inner sides of the jaws in rear of their pivotal axes, and a ring surrounding the jaws and mounted for circumferential movement on the head, the said ring being provided with a cam surface adapted to engage the radial fingers on the jaws and operating to control the movements of the jaws.

7. In a chuck, the combination of a head or frame provided with a work seat, clamping jaws pivoted to said head and extending generally axially thereof, the front ends of said jaws being extended radially inwardly and being provided with clamping surfaces extending obliquely with reference to the plane of the work seat, and adapted to move inwardly toward the work seat in the pivotal motions of the jaws, and yielding means sustained by the head and acting to urge said clamping surfaces of the jaws toward the work seat, whereby said clamping surfaces will engage the outer end of the work on the seat with a wedging action.

In testimony whereof, I have affixed my signature in presence of two witnesses.

FRED E. BRIGHT.

Witnesses:
 CHARLES S. BUTLER,
 MARY M'CALLA.